(12) United States Patent
March Nomen (10) Patent No.: US 11,713,749 B2
(45) Date of Patent: Aug. 1, 2023

(54) LIGHTNING PROTECTION SYSTEM FOR A CARBON PULTRUDED BLADE AND CARBON PULTRUDED BLADE

(71) Applicant: Siemens Gamesa Renewable Energy Innovation & Technology S.L., Sarriguren (ES)

(72) Inventor: Victor March Nomen, Les Fonts (ES)

(73) Assignee: SIEMENS GAMESA RENEWABLE ENERGY INNOVATION & TECHNOLOGY S.L.

( * ) Notice: Subject to any disclaimer, the term of this patent is extended or adjusted under 35 U.S.C. 154(b) by 0 days.

(21) Appl. No.: 17/379,277

(22) Filed: Jul. 19, 2021

(65) Prior Publication Data

US 2022/0025869 A1 Jan. 27, 2022

(30) Foreign Application Priority Data

Jul. 22, 2020 (EP) ..................................... 20382659

(51) Int. Cl.
*F03D 80/30* (2016.01)

(52) U.S. Cl.
CPC ...... *F03D 80/30* (2016.05); *F05B 2280/2006* (2013.01); *F05B 2280/6001* (2013.01)

(58) Field of Classification Search
CPC .................. F03D 80/30; F03D 1/0675; F05B 2280/2006; F05B 2280/6001
See application file for complete search history.

(56) References Cited

U.S. PATENT DOCUMENTS

| 8,540,491 B2 * | 9/2013 | Gruhn ....................... F03D 9/25 |
| | | 416/230 |
| 9,816,482 B2 * | 11/2017 | Caruso .................. F03D 1/0633 |
| 2006/0280613 A1 | 12/2006 | Hansen |

(Continued)

FOREIGN PATENT DOCUMENTS

| CN | 1860654 A | 11/2006 |
| CN | 1867772 A | 11/2006 |

(Continued)

OTHER PUBLICATIONS

European Search Report dated Dec. 21, 2020 for Application No. 20382659.9.

*Primary Examiner* — David E Sosnowski
*Assistant Examiner* — Wayne A Lambert
(74) *Attorney, Agent, or Firm* — Schmeiser, Olsen & Watts LLP (57) ABSTRACT

Provided is a lightning protection system for a carbon pultruded blade including a stack of carbon pultruded layers having at least a bottom layer and a top layer, each layer having a first end and a second end; the stack defining a tip-region, a root-region, and a mid-region; at least one lightning conductor extending along the stack from the tip-region to the root-region; and a plurality of electrical connections connecting the stack of layers with the lightning conductor, each end of each layer is electrically connected with the lightning conductor by one of the electrical connections; and each electrical connection that connects one of the ends of the top layer with the lightning conductor is electrically connected with the bottom layer. A carbon pultruded blade is also provided.

16 Claims, 5 Drawing Sheets

(56) References Cited

U.S. PATENT DOCUMENTS

| | | | |
|---|---|---|---|
| 2007/0074892 A1* | 4/2007 | Hibbard | H02G 13/40 |
| | | | 174/117 FF |
| 2013/0149153 A1* | 6/2013 | Fujioka | H02G 13/00 |
| | | | 416/229 R |
| 2015/0292479 A1 | 10/2015 | Ohlerich et al. | |
| 2016/0221272 A1 | 8/2016 | Koefoed et al. | |
| 2016/0369781 A1 | 12/2016 | March Nomen et al. | |
| 2018/0156202 A1 | 6/2018 | Lipka et al. | |
| 2020/0263657 A1 | 8/2020 | Badger et al. | |
| 2021/0404443 A1* | 12/2021 | Thwaites | F03D 80/30 |
| 2022/0003215 A1* | 1/2022 | Thwaites | F03D 1/0675 |

FOREIGN PATENT DOCUMENTS

| | | | | |
|---|---|---|---|---|
| CN | 105392621 A | 3/2016 | | |
| CN | 106257049 A | 12/2016 | | |
| CN | 111344486 A | 6/2020 | | |
| EP | 3184814 A1 | 6/2017 | | |
| EP | 3330528 A1 | 6/2018 | | |
| EP | 3757383 A1 * | 12/2020 | | B29C 70/52 |
| JP | 2013148021 A | 8/2011 | | |
| WO | 2020103991 A1 | 5/2020 | | |
| WO | 2020104585 A1 | 5/2020 | | |
| WO | WO-2021110225 A1 * | 6/2021 | | |

\* cited by examiner

LIGHTNING PROTECTION SYSTEM FOR A CARBON PULTRUDED BLADE AND CARBON PULTRUDED BLADE

CROSS-REFERENCE TO RELATED APPLICATIONS

This application claims priority to EP Application No. 20382659.9, having a filing date of Jul. 22, 2020, the entire contents of which are hereby incorporated by reference.

FIELD OF TECHNOLOGY

The following relates to a lightning protection system for a carbon pultruded blade and a carbon pultruded blade comprising said lightning protection system.

BACKGROUND

Carbon fiber-reinforced spar caps of wind turbine rotor blades require a lightning protection system due to the electrical conductivity of the carbon fiber layers. It is known to use an equipotential bonding element between such spar cap and a lightning conductor extending adjacent to the spar cap in order to avoid electric arcing between the carbon fiber layers of the spar cap that may cause damage to the rotor blade.

The use of carbon pultruded plates for producing the layers of the spar caps of wind turbine rotor blades it is also known. Carbon pultruded plates are produced using a pultrusion method. The plates are formed by carbon fibers oriented exactly in the longitudinal direction with a particularly high fiber volume content. The use of carbon pultruded plates makes it possible to produce spar caps which are superior in terms of strength allowing the manufacturing of longer rotor blades. However, carbon pultruded plates are a material in which the surface of the plates contain a thin layer of insulator which avoids a good electrical contact between plates. So, from an electrical point of view, a spar cap formed by layers of carbon pultruded plates can be represented as many parallel conductors having different length, and with a poor electric insulation between the adjacent layers. Thus, wind turbine rotor blades having carbon pultruded layers require an improved lightning protection system to reduce electric arcing between the carbon pultruded layers.

EP3330528A1 shows a lightning protection system for a carbon pultruded blade comprising a stack of carbon pultruded layers having a bottom layer 18 and a top layer 30, each layer having a first end 16a and a second end 16b; the stack of carbon pultruded layers defining a tip-region, a root-region, and a mid-region arranged between the tip-region and the root-region; at least one lightning conductor extending 32 along said stack of carbon pultruded layers from the tip-region to the root-region; and an equipotential bonding element 22 and 24 electrically connecting said stack of carbon pultruded layers with said lightning conductor 32.

In particular, EP3330528A1 show a stack of carbon pultruded layers comprising a first bottom layer 18, a second layer 20, a third layer 26, a fourth layer 28 and a top layer 30. The equipotential bonding element comprises a first sheet 22 of a carbon fiber material that extends over the entire length of the stack of carbon pultruded layers. The first sheet 22 is connected over the entire length of the lightning conductor 32 and rests flat against the first end 16a and the second end 16b of the bottom layer 18 of the stack of carbon pultruded layers. The equipotential bonding element may comprise a second sheet 24 of a carbon fiber material which is also connected to the lightning conductor 32. In a first embodiment, the second sheet 24 is subdivided into a first portion 24a and second portion 24b between which there is a gap. The first portion 24a rests against the first end 16a of the bottom layer 18, the second layer 20 and the third layer 26 of the blade-root side, and the second portion 24b rests against the second end 16b of the bottom layer 18, the second layer 20 and the third layer 26 of the blade-tip side, while the fourth layer 28 and the top layer 30 are not covered. In a second embodiment, the second sheet 24 extends over the entire length of the stack of layers resting against all of the blade root-side and blade tip-side ends of the layers, and also resting over the top layer 30.

SUMMARY

An aspect relates to provide a lightning protection system for a carbon pultruded blade and a carbon pultruded blade.

A first aspect of embodiments of the invention relates to a lightning protection system comprising:

a stack of carbon pultruded layers having at least a bottom layer and a top layer, each layer having a first end and a second end; the stack of carbon pultruded layers defining a tip-region, a root-region, and a mid-region arranged between the tip-region and the root-region;

at least one lightning conductor extending along said stack of carbon pultruded layers from the tip-region to the root-region; and an equipotential bonding element electrically connecting said stack of carbon pultruded layers with said lightning conductor; wherein said equipotential bonding element comprises a plurality of electrical connections;

each end of each carbon pultruded layer is electrically connected with the lightning conductor by one of said electrical connections; and each electrical connection that connects one of the ends of the top layer with the lightning conductor is electrically connected with the bottom layer of the stack of carbon pultruded layers.

A second aspect of embodiments of the invention relates to a carbon pultruded blade comprising the lightning protection system defined above.

Connecting each end of each carbon pultruded layer with the lightning conductor by an independent electrical connection allows a safe distribution of the lightning currents along the stack of carbon pultruded layers and the lightning conductor. The lightning current is distributed equitably through the carbon pultruded layers and the lightning conductor, thus less lightning current pass through the carbon pultruded layers comparing with conventional art lightning protection systems. Moreover, the electrical connections that connect the top layer with the lightning conductor are electrically connected with the bottom layer arranged below the top layer, this avoids electric arcing between the layers because all the electric contact points of each electrical connection of the lightning protection system have a similar electrical voltage.

For example, EP3330528A1 do not show connecting each end of each carbon pultruded layer with the lightning conductor by an independent electrical connection, nor connect each end of the top layer with the bottom layer by one of said independent electrical connections, thus electric arcing may occur between layers. EP3330528A1 show an equipotential bonding element comprising a first electrical connection consisting of a first sheet of a carbon fiber material and a second electrical connection consisting of second sheet of a carbon fiber material. These sheets create electric contact points in the layers having different electrical voltage, this may produce some delaminations during lightning current injection which could produce mechanical breakage of the layers. Moreover, the carbon fiber material of the first and second sheets which extends over the entire length of the stack of layers increasing the cost of the blade.

These and other advantages and features of embodiments of the invention will become apparent in view of the figures and the detailed disclosure of embodiments of the invention.

BRIEF DESCRIPTION

Some of the embodiments will be described in detail, with reference to the following figures, wherein like designations denote like members, wherein.

DETAILED DESCRIPTION

Figure 1:
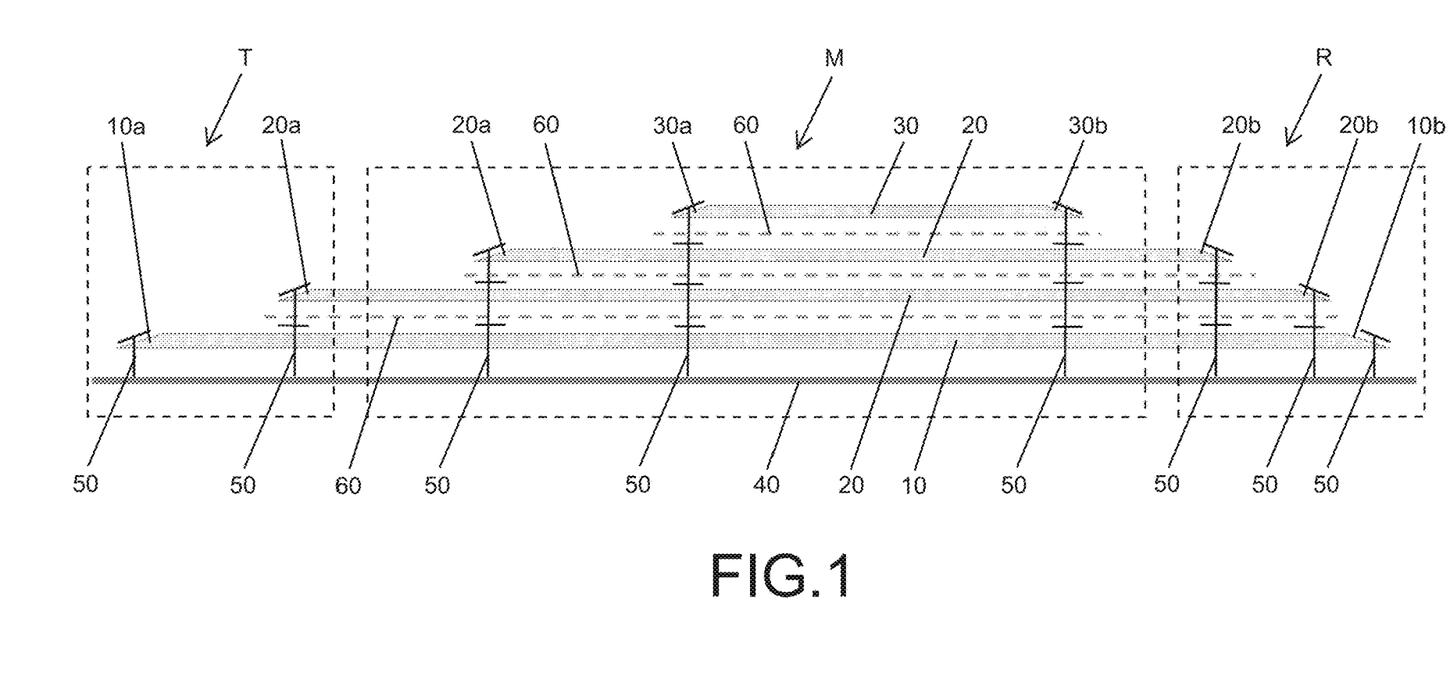
FIG. 1 shows a lightning protection system for a carbon pultruded blade according to a first embodiment of the invention showing a stack of four layers.
Figure 2:
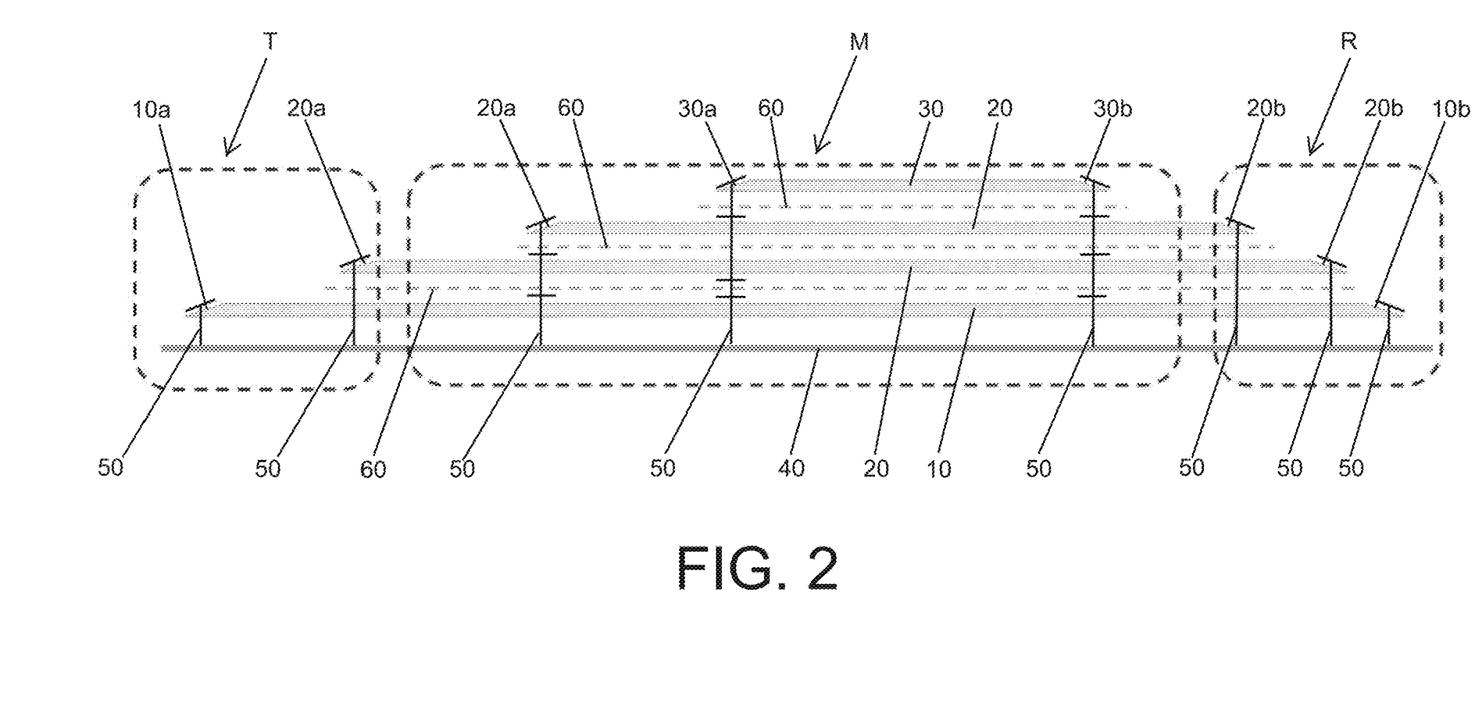
FIG. 2 shows a lightning protection system for a carbon pultruded blade according to a second embodiment of the invention, wherein electrical connections between layers are only established in the mid-region of the stack of layers.
Figure 6:
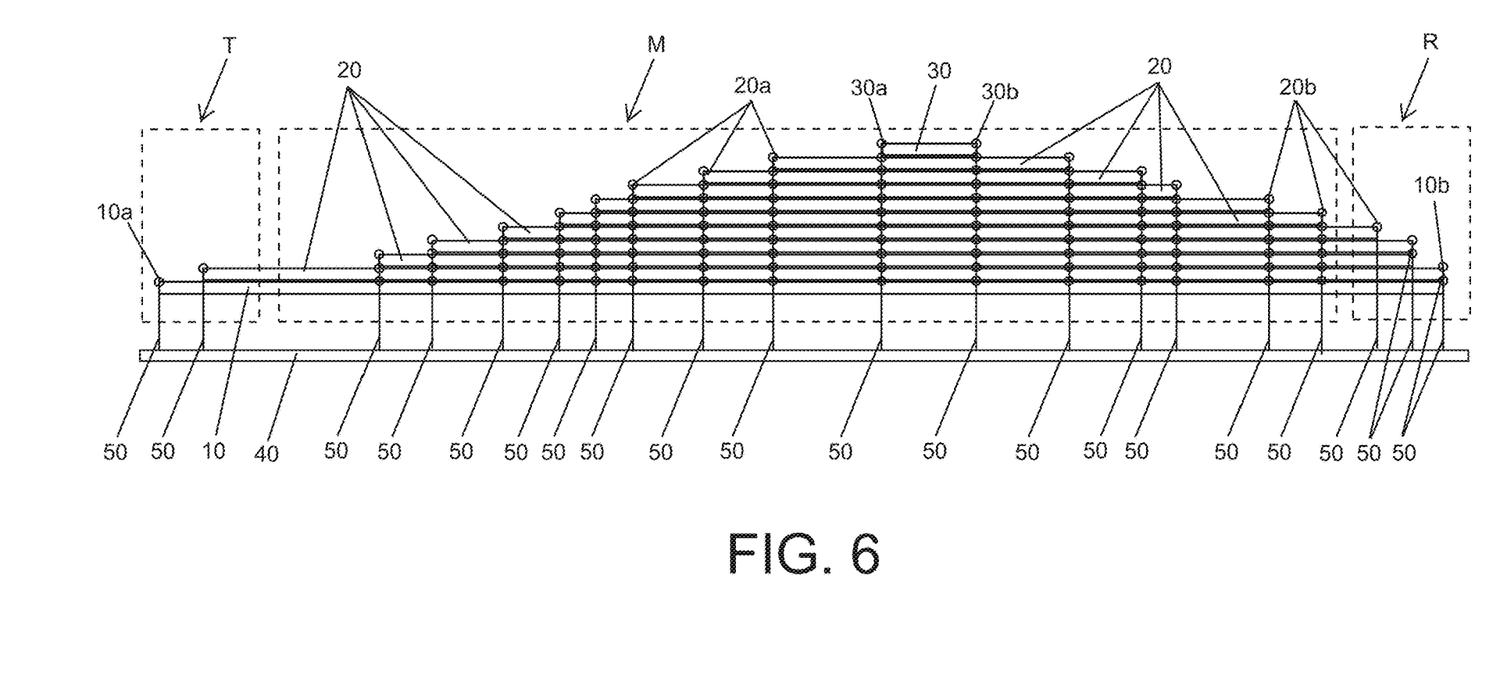
FIG. 6 shows a lightning protection system for a carbon pultruded blade according to a third embodiment of the invention showing a stack of eleven carbon pultruded layers.

FIGS. 1, 2 and 6 show a lightning protection system for a carbon pultruded blade according to embodiments of the invention. The lightning protection system comprises a stack of carbon pultruded layers having a bottom layer 10, a plurality of intermediate layers 20 and a top layer 30, each layer 10,20,30 having a first end 10a,20a,30a and a second end 10b,20b,30b, the stack of carbon pultruded layers defining a tip-region T, a root-region R, and a mid-region M arranged between the tip-region T and the root-region R, at least one lightning conductor 40 extending along said stack of carbon pultruded layers 10,20,30 from the tip-region T to the root-region R, and an equipotential bonding element electrically connecting said stack of carbon pultruded layers 10,20,30 with said lightning conductor 40.

The layers 10,20,30 are arranged on top of each other, the intermediate layers 20 are arranged onto the bottom layer 10, and the top layer 30 is arranged onto the intermediate layers 20. The stack of layers 10,20,30 has a pyramid shape, the top layer 30 has a smaller length than the intermediate layers 20, and the intermediate layers 20 have a smaller length than the bottom layer 30.

The mid-region M is greater than the tip-region T, or the root-region R. The mid-region M is at least 65% of the total length of the stack of carbon pultruded layers. The mid-region M is at least 70% of the total length of the stack of carbon pultruded layers. For example, the total length of the stack of carbon pultruded layers may be between 50-90 meters, and the tip-region T, or the root-region R, may have a length between 0.8-8 meters. For example, a stack of 50 meters may have a tip-region T of 0.8 meters, a mid-region M of 48.4 meters, and root-region R of 0.8 meters. A stack of 90 meters may have a tip-region T of 8 meters, a mid-region M of 74 meters, and root-region R of 8 meters. A stack of 50 meters may have a tip-region T of 8 meters, a mid-region M of 34 meters, and root-region R of 8 meters. In any case, the tip-region T, or the root-region R, has a length of 10 meters or less, and a length between 0.8-10 meters regardless the total length of the stack of carbon pultruded layers.

The equipotential bonding element comprises a plurality of electrical connections 50, each end 10a,20a,30a,10b,20b, 30b of each carbon pultruded layer 10,20,30 is electrically connected with the lightning conductor 40 by one of said electrical connections 50, and at least each electrical connection 50 that connects one of the ends 30a,30b of the top layer 30 with the lightning conductor 40 is electrically connected with the bottom layer 10 of the stack of carbon pultruded layers 10,20,30. Thus the current flowing through the lightning conductor 40 is injected individually to each layer, allowing a safe distribution of the current between layers.

Each electrical connection 50 that connects one of the ends 30a,30b of the top layer 30 with the lightning conductor 40 is electrically connected with the bottom layer 10 and with the intermediate layers 20 arranged below the top layer 30 in the stack of carbon pultruded layers 10,20,30. By doing this, derivations are created in the mid-region M by the connection established between the top layer 30 and the other layers 20,10 of the stack arranged below the top layer 30, thus reducing the risk of having electric arcing between layers in the mid-region M.

Each electrical connection 50 arranged in the mid-region M and that connects one of the ends 20a,20b of one of the intermediate layers 20 with the lightning conductor 40 is electrically connected with the bottom layer 10 and with the others intermediate layers 20 arranged below said intermediate layer 20 in the stack of carbon pultruded layers 10,20,30. This further reduces the risk having electric arcing between layers.

Alternatively, each electrical connection 50 that connects one of the ends 20a,20b of one of the intermediate layers 20 with the lightning conductor 40 is electrically connected with the bottom layer 10 and with the others intermediate layers 20 arranged below said intermediate layer 20 in the stack of carbon pultruded layers 10,20,30.

Each electrical connection 50 that connects one of the ends 30a,30b of the top layer 30 with the lightning conductor 40 is electrically connected with an intermediate point of each intermediate layer 20 and with an intermediate point of the bottom layer 10, and each electrical connection 50 that connects one of the ends 20a,20b of one of the intermediate layers 20 with the lightning conductor 40 is electrically connected with an intermediate point of each intermediate layer 20 arranged below said intermediate layer 20 in the stack of carbon pultruded layers 10,20,30 and also with an intermediate point of the bottom layer 10.

As illustrated in FIGS. 1, 2 and 6, said intermediate points connected by one electrical connection 50 are vertically aligned between them and vertically aligned with the respective end 30a,30b of the top layer 30, or the respective end 20a,20b of the intermediate layer 20 arranged above in the stack of carbon pultruded layers 10,20,30.

The electrical connections 50 have electrical contacting points for contacting the layers 10,20,30. In FIGS. 1 and 2 said electrical contacting points are represented by segments transverse to the electrical connections 50. Said electrical contacting points contact the ends 10a,20a,30,10b,20b,30b of the layers 10,20,30 and also the intermediate points of the intermediate layers 20 and the bottom layer 10. In FIG. 6 said electrical contacting points are represented by circles. As it can be shown in the figures the electrical contacting points of each electrical connection 50 are vertically aligned. The electrical contacting points coincide with the ends of the layers and with the intermediate points.

Figure 5:
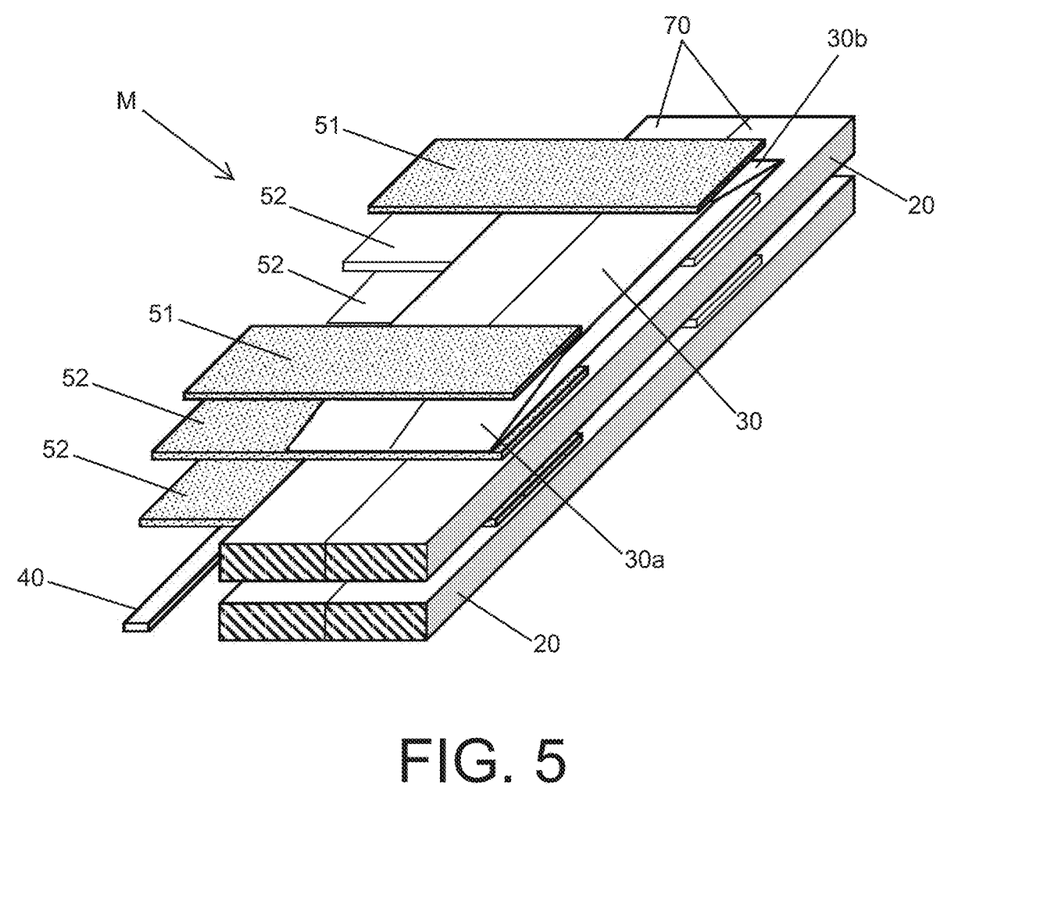
FIG. 5 shows conductive fabrics arranged on the upper face of the layers for establishing the electrical connections.

FIG. 5 shows a way to establish electrical contacting points for contacting the layers. The electrical connections 50 comprise conductive fabrics 51,52 which extend in a cross direction to the stack of layers 10,20,30. First conductive fabrics 51 are arranged over the ends 10a,20,30a,10b, 20b,30b of the layers 10,20,30 and second conductive fabrics 52 are arranged over the intermediate layers 20 and the bottom layer 10.

FIG. 5 shows a partial view of the top layer 30 and two intermediate layers 20 placed below the top layer 20. Two first conductive fabrics 51 are arranged over the first 30a and second 30b ends of the top layer 30 and four second conductive fabrics 52 are arranged over intermediate points of the intermediate layers 20 placed below the top layer 30. The first conductive fabric 51 is placed over the oblique first end 30a of the top layer 30, and the two second conductive fabrics 52 arranged over the intermediate points of the intermediate layers 20 placed below the top layer 30 are vertically aligned with the first conductive fabric 51. Same occurs with the first conductive fabric 51 placed over the oblique second end 30b of the top layer 30 and the other two second conductive fabrics 52.

The conductive fabrics 51, 52 protrude from the stack of layers a certain length, thus in the vacuum process for obtaining the carbon pultruded blade, the conductive fabrics 51, 52 are overlapped between them and also with the lightning conductor 40, thus establishing the electrical connections 50. Alternatively, the conductive fabrics 51, 52 may be connected between them and with the lightning conductor 40 by means of another conductive element.

The conductive fabrics 51, 52 are carbon fibre fabrics. More preferably biaxial carbon fibre fabrics.

The conductive fabrics 51,52 extends over the upper face of the layers 10,20,30 allowing an easier manufacturing process of the carbon pultruded blade.

Figure 3:
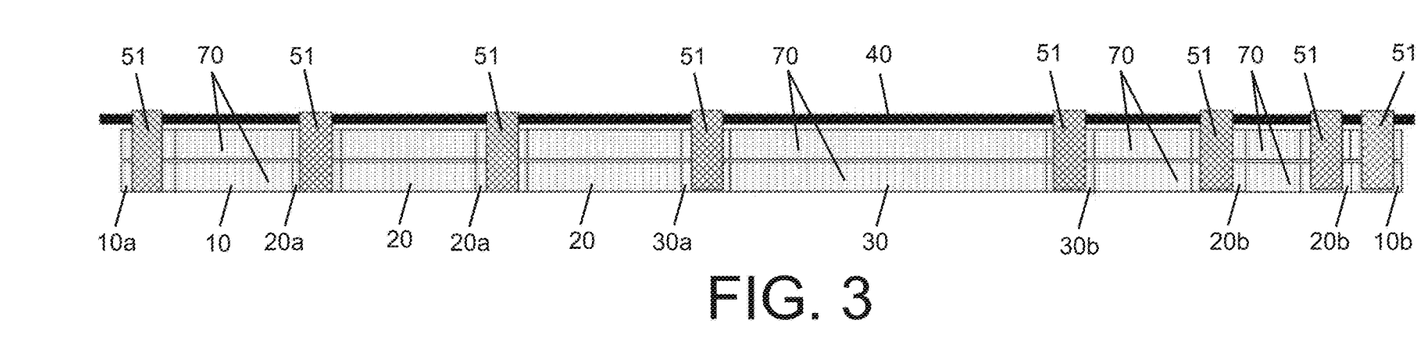
FIG. 3 shows a top view of the lightning protection system of FIG. 1 showing a single lightning conductor extending adjacent to a side of the stack of layers.
Figure 4:
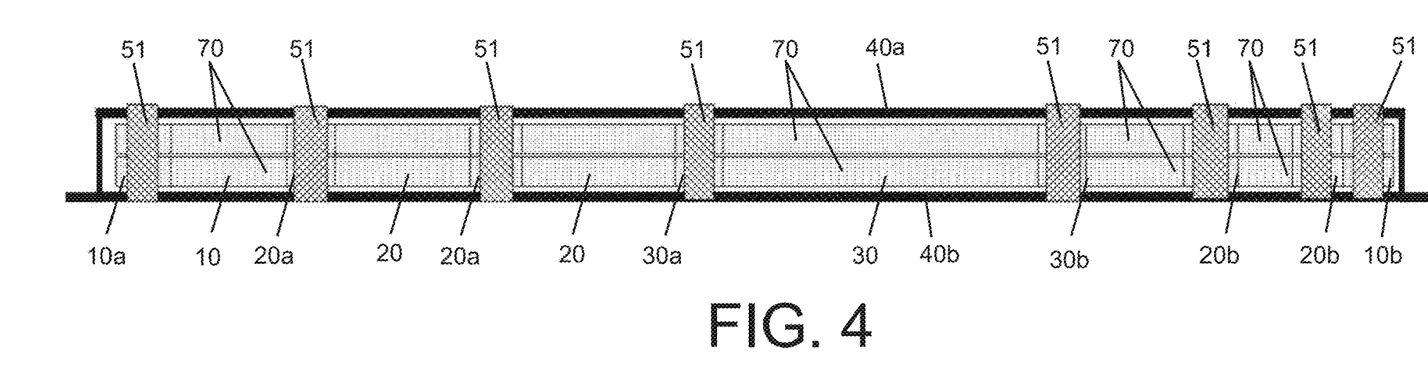
FIG. 4 shows a top view of the lightning protection system of FIG. 1 showing a lightning conductor extending adjacent to each side of the stack of layers.

Each layer 10, 20, 30 of the stack of carbon pultruded layers 10, 20, 30 comprises at least one carbon pultruded plate 70. As shown in FIGS. 3, 4 and 5, each layer comprises two carbon pultruded plates 70. In any case, the number of plates employed in creating the layer depends on the width of the plates 70, for example a layer may have between 1 to 7 plates.

Said plates have a width between 50-300 mm, or even more.

The carbon pultruded plates contain a thin layer of insulator which improves the adherence but avoids a good electrical contact between layers. Thus, plates may be required to be polished to assure a good electrical connection between the conductive fabrics 51,52 and the plates 70. In any case, it is only required to polish a limited space of the layers to assure the electrical connection.

An inter plate material 60 is arranged between the layers 10,20,30 of the stack of carbon pultruded layers which increase the strength of the stack of layers and the adherence between layers. An inter plate material 60 is arranged between two adjacent layers of the stack. The inter plate material 60 is arranged below a layer 30 or 20 and onto the conductive fabrics 51 or 52. Said inter plate material 60 may be carbon fiber or glass fibre. Carbon fiber have better properties than glass fibre and is better for increasing the strength of the blade against lightning, but it is more expensive. The lightning protection system of embodiments of the invention reduces the chances of having electric arcing between layers, thus allows to use glass fibre instead of carbon fiber, and also allows to use less fibre than in conventional art solutions.

FIG. 3 shows a single lightning conductor 40 extending adjacent to a side of the stack of carbon pultruded layers 10, 20, 30 from the tip-region T to the root-region R.

FIG. 4 shows two lightning conductors 40a, 40b extending along the stack of carbon pultruded layers 10, 20, 30 from the tip-region T to the root-region R, each of said conductors 40a, 40b extending adjacent to a side of the stack of carbon pultruded layers 10, 20, 30. The electrical connections 50 are electrically connected to both lightning conductors 40a, 40b, and the lightning conductors 40a, 40b are electrically connected between them. Thus, conductive fabrics 51 and 52 protrude from each side of the stack of layers a certain length in order to establish the electrical connection after the vacuum process. Having two lightning conductors 40a, 40b reduces the current flowing through the layers of the stack.

By way of example the stack of FIGS. 1 and 2 contains four layers, however, the stack may comprises two layers 10 and 30, (a bottom layer 10 and a top layer 30), three layers 10,20 and 30 (a bottom layer 10, an intermediate layer and a top layer 30), or more than three layers as depicted in FIGS. 1, 2 and 6. The number of layers employed in the carbon pultruded blade depend on many factors, as for example the length and the strength requirements of the carbon pultruded blade, or the width of the carbon pultrude plates employed in manufacturing the layers. Thickness of a carbon pultruded plate may be between 1-5 mm or more.

For example, the equipotential bonding element of a lightning protection system comprising a stack of two carbon pultruded layers have four electrical connections 50. The stack of carbon pultruded layers have the bottom layer 10, and the top layer 30, each layer 10,30 having a first end 10a,30a and a second end 10b,30b Each end 10a,30a,10b, 30b of each carbon pultruded layer 10,30 is electrically connected with the lightning conductor 40 by one of said electrical connections 50, and each electrical connection 50 that connects one of the ends 30a,30b of the top layer 30 with the lightning conductor 40 is electrically connected with the bottom layer 10 of the stack of carbon pultruded layers 10,30.

For example, the equipotential bonding element of a lightning protection system comprising a stack of three carbon pultruded layers have six electrical connections 50. The stack of carbon pultruded layers have the bottom layer 10, one intermediate layer 20, and the top layer 30, each layer 10,20,30 having a first end 10a,20a,30a and a second end 10b,20b,30b, the layers 10,20,30 are arranged on top of each other, the intermediate layer 20 is arranged onto the bottom layer 10, and the top layer 30 is arranged onto the intermediate layer 20, and each electrical connection 50 that connects one of the ends 30a,30b of the top layer 30 with the lightning conductor 40 is electrically connected with the intermediate layer 20 and with the bottom layer 10 of said stack of carbon pultruded layers 10,20,30. Additionally, each electrical connection 50 that connects one of the ends 20a,20b of the intermediate layer 20 with the lightning conductor 40 is electrically connected with the bottom layer 10 of said stack of carbon pultruded layers 10,20,30.

FIG. 1 shows a lightning protection system for a carbon pultruded blade according to a first embodiment of the invention. FIG. 1 shows a lightning protection system comprising a stack of four carbon pultruded layers having a first bottom layer 10, a second intermediate layer 2, a third intermediate layer 20, and a fourth top layer 30. The system has eight electrical connections 50 extending from each end of each carbon pultruded layer 10,20,30 to the lightning conductor 40. The two electrical connections 50 that connect the ends 30a and 30b of the top layer 50 with the lightning conductor 40 are electrically connected with the second and third intermediate layers 20 and with the bottom layer 10. The two electrical connections 50 that connect the ends 20a and 20b of the third intermediate layer 20 with the lightning conductor 40 are electrically connected with the second intermediate layer 20 and with the bottom layer 10. The two electrical connections 50 that connect the ends 20a and 20b of the second intermediate layer 20 with the lightning conductor 40 are electrically connected with the bottom layer 10. The two electrical connections 50 that connect the ends 10a and 10b of the bottom layer 10 with the lightning conductor 40 are not connected with any layer of the stack.

In FIG. 1, each electrical connection 50 that connects one of the ends 30a,30b of the top layer 30 with the lightning conductor 40 is electrically connected with an intermediate point of each intermediate layer 20 and with an intermediate point of the bottom layer 10, said intermediate points are vertically aligned between them and vertically aligned with the respective end 30a,30b of the top layer 30, and each electrical connection 50 that connects one of the ends 20a,20b of one of the intermediate layers 20 with the lightning conductor 40 is electrically connected with an intermediate point of each intermediate layer 20 arranged below said intermediate layer 20 in the stack of carbon pultruded layers 10,20,30 and also with an intermediate point of the bottom layer 10, said intermediate points are vertically aligned between them and vertically aligned with the respective end 20a,20b of the intermediate layer 20 arranged above in the stack of carbon pultruded layers 10,20,30.

FIG. 2 shows a lightning protection system for a carbon pultruded blade according to a second embodiment of the invention. The lightning protection system of FIG. 2 is the same as FIG. 1 but not all of the electrical connection 50 that connect the ends 20a,20b of the intermediate layers 20 with the lightning conductor 40 are electrically connected with the others intermediate layers 20.

FIG. 2 shows a lightning protection system comprising a stack of four carbon pultruded layers having a first bottom layer 10, a second intermediate layer 20 a third intermediate layer 20, and a fourth top layer 30. The system has eight electrical connections 50 extending from each end of each carbon pultruded layer 10,20,30 to the lightning conductor 40. In the mid-region M there are arranged three electrical connections 50, in tip-region T there are arranged two electrical connections 50 and in the root-region R there are arranged three electrical connections 50. The two electrical connections 50 that connect the ends 30a and 30b of the top layer 50 with the lightning conductor 40 are electrically connected with the second and third intermediate layers 20 and with the bottom layer 10. The electrical connection 50 arranged in the mid-region M and that connects the first end 20a of the third intermediate layer 20 with the lightning conductor 40 is electrically connected with the second intermediate layer 20 and the bottom layer 10, and the electrical connection 50 arranged in the root-region R and that connects the second end 20b of the third intermediate layer 20 with the lightning conductor 40 is not connected with any other layer of the stack. The electrical connection 50 arranged in the tip-region T and that connects the first end 20a of the second intermediate layer 20 with the lightning conductor 40 is not connected with any other layer of the stack, and the electrical connection 50 arranged in the root-region R and that connects the second end 20b of the second intermediate layer 20 with the lightning conductor 40 is not connected with any other layer of the stack. The two electrical connections 50 that connect the ends 10a and 10b of the bottom layer 10 with the lightning conductor 40 are not connected with any layer of the stack.

As stated before, the first end 20a of the second intermediate layer 20 arranged in the tip-region T is close to the first end 10a of the bottom layer, for example 0.8-8 meters, thus the electrical connection 50 that connects the first end 20a of the second intermediate layer 20 with the lightning conductor 40 does not require to be connected with the bottom layer 10, because there are low chances of having an electric arcing between the first end 20a of the second intermediate layer 20 and the bottom layer 10. Same occurs in the root-region R, for example, the second end 20b of the third intermediate layer 20 arranged in the root-region R is close to the second end 10b of the bottom layer 10, for example 0.8-8 meters, thus the electrical connection 50 that connects second end 20b of the third intermediate layer 20 with the lightning conductor 40 does not require to be connected with other layers 20 or 10. Therefore, only electrical connections 50 arranged in the mid-region M needs to be connected with the intermediate layers 20 and the bottom layer 10 in order to avoid electric arcing between layers 10,20,30.

In FIG. 2, each electrical connection 50 that connects one of the ends 30a,30b of the top layer 30 with the lightning conductor 40 is electrically connected with an intermediate point of each intermediate layer 20 and with an intermediate point of the bottom layer 10, said intermediate points are vertically aligned between them and vertically aligned with the respective end 30a,30b of the top layer 30, and each electrical connection 50 arranged in the mid-region M and that connects one of the ends 20a,20b of one of the intermediate layers 20 with the lightning conductor 40 is electrically connected with an intermediate point of each intermediate layer 20 arranged below said intermediate layer 20 in the stack of carbon pultruded layers 10,20,30 and also with an intermediate point of the bottom layer 10, said intermediate points are vertically aligned between them and vertically aligned with the respective end 20a,20b of the intermediate layer 20 arranged above in the stack of carbon pultruded layers 10,20,30.

In FIG. 1 the electrical contacting points of the electrical connections 50 are arranged over the upper face of the layers. This allows an easier manufacturing process of the carbon pultruded blade, however, as represented in FIG. 2, the electrical contacting points may be arranged in the upper face or the lower face of the layers. In any case, the ubication of the electrical contacting points is not essential, it is only necessary to assure a good electrical contact with the layers.

FIG. 6 shows a lightning protection system for a carbon pultruded blade according to a third embodiment of the invention. All the features described above for the first and second embodiments of FIGS. 1 and 2 can be applied to the embodiment of FIG. 6. FIG. 6 shows a lightning protection system comprising a stack of eleven carbon pultruded layers having a bottom layer 10, nine second intermediate layers 20, and a top layer 30. As stated before, the electrical connections 50 arranged in the tip-region T or the root-region R does not require to be connected with the intermediate points of the intermediate layers 20 or the bottom layer 10. Note that in the root-region R the second ends 20b,10b of the intermediate layers 20 and the bottom layer 10 are very close, some of said ends may be overlapping, thus the chances of having an electric arcing between said points is very low. For example, the total length of the stack of carbon pultruded layers may be between 50-90 meters, and the tip-region T, or the root-region R, may have a length between 0.8-8 meters.

Embodiments of the invention also relate to a carbon pultruded blade comprising the lightning protection system describe above. The lightning protection is part of the spar cap of a carbon pultruded blade of a wind rotor. Each spar cap of a carbon pultruded blade comprises a lightning protection system as described above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A lightning protection system for a carbon pultruded blade comprising:
a stack of carbon pultruded layers having at least a bottom layer and a top layer, each layer having a first end and a second end; the stack of carbon pultruded layers defining a tip-region, a root-region, and a mid-region arranged between the tip-region and the root-region;
at least one lightning conductor extending along the stack of carbon pultruded layers from the tip-region to the root-region; and
an equipotential bonding element electrically connecting the stack of carbon pultruded layers with the lightning conductor, wherein
the equipotential bonding element comprises a plurality of electrical connections;
each end of each carbon pultruded layer is electrically connected with the lightning conductor by one of the electrical connections;
each electrical connection that connects one of the ends of the top layer with the lightning conductor is electrically connected with the bottom layer of the stack of carbon pultruded layers;
each electrical connection includes at least two electrical contacting points; and
the at least two electrical contacting points of a respective electrical connection are substantially vertically aligned.

2. The system according to claim 1, wherein the stack of carbon pultruded layers have the bottom layer, at least one intermediate layer, and the top layer, each layer having a first end and a second end, the layers are arranged on top of each other, the at least one intermediate layer is arranged onto the bottom layer, and the top layer is arranged onto the at least one intermediate layer; and wherein each electrical connection that connects one of the ends of the top layer with the lightning conductor is electrically connected with the at least one intermediate layer and with the bottom layer of the stack of carbon pultruded layers.

3. The system according to claim 2, wherein an electrical connection that connects one of the ends of the at least one intermediate layer with the lightning conductor is electrically connected with the bottom layer of the stack of carbon pultruded layers.

4. The system according to claim 3, wherein the stack of carbon pultruded layers have the bottom layer, a plurality of intermediate layers, and the top layer, each layer having a first end and a second end, the layers are arranged on top of each other, the intermediate layers are arranged onto the bottom layer, and the top layer is arranged onto the intermediate layers; and wherein each electrical connection that connects one of the ends of the top layer with the lightning conductor is electrically connected with the bottom layer and with the intermediate layers arranged below the top layer in the stack of carbon pultruded layers; and wherein an electrical connection arranged in the mid-region and that connects one of the ends of one of the intermediate layers with the lightning conductor is electrically connected with the bottom layer and with the other intermediate layers arranged below the one of the intermediate layers in the stack of carbon pultruded layers.

5. The system according to claim 4, wherein each electrical connection that connects one of the ends of one of the intermediate layers with the lightning conductor is electrically connected with the bottom layer and with the other intermediate layers arranged below the one of the intermediate layers in the stack of carbon pultruded layers.

6. The system according to claim 4, wherein each electrical connection that connects one of the ends of the top layer with the lightning conductor is electrically connected with an intermediate point of each intermediate layer and with an intermediate point of the bottom layer, the respective intermediate points are vertically aligned between them and vertically aligned with the respective end of the top layer; and wherein each electrical connection arranged in the mid-region and that connects one of the ends of one of the intermediate layers with the lightning conductor is electrically connected with an intermediate point of each intermediate layer arranged below the one of the intermediate layers in the stack of carbon pultruded layers and also with an intermediate point of the bottom layer, the respective intermediate points are vertically aligned between them and vertically aligned with the respective end of the one of the intermediate layers arranged above in the stack of carbon pultruded layers.

7. The system according to claim 6, wherein each electrical connection that connects one of the ends of one of the intermediate layers with the lightning conductor is electrically connected with an intermediate point of each intermediate layer arranged below the one of the intermediate layers in the stack of carbon pultruded layers and also with an intermediate point of the bottom layer, the respective intermediate points are vertically aligned between them and vertically aligned with the respective end of the one of the intermediate layers arranged above in the stack of carbon pultruded layers.

8. The system according to claim 1, wherein the electrical connections comprise conductive fabrics which extend in a cross direction to the stack of layers.

9. The system according to claim 8, wherein the conductive fabrics are carbon fibre fabrics.

10. The system according to claim 8, wherein the conductive fabrics extend over an upper face of the carbon pultruded layers.

11. The system according to claim 1 wherein two lightning conductors extend along the stack of carbon pultruded layers from the tip-region to the root-region, each of the conductors extending adjacent to a side of the stack of carbon pultruded layers, and wherein the electrical connections are electrically connected to both lightning conductors.

12. The system according to claim 1 wherein an inter plate material is arranged between the layers of the stack of carbon pultruded layers.

13. The system according to claim 12 wherein inter plate material is glass fibre.

14. The system according to claim 1 wherein each layer of the stack of carbon pultruded layers comprises at least one carbon pultruded plate.

15. A carbon pultruded blade comprising the lightning protection system according to claim 1.

16. The system according to claim 8, wherein the conductive fabrics extend over an oblique upper face of the carbon pultruded layers.

* * * * *